3,244,630
CONTROL OF BACTERIA IN PRODUCTION
COOLANTS BY USING IODINE
Morris I. Sheikh, Plymouth, Mich., assignor to Ford Motor Company, Dearborn, Mich., a corporation of Delaware
Filed Jan. 8, 1965, Ser. No. 424,342
5 Claims. (Cl. 252—49.5)

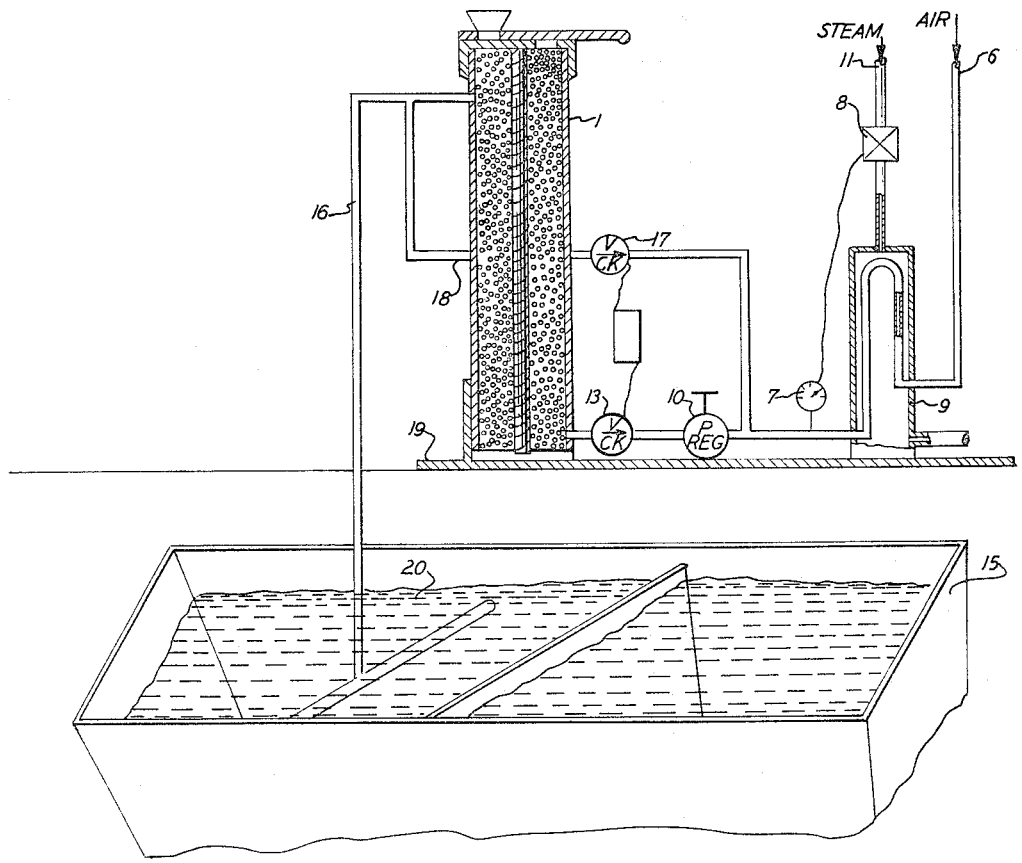

This application is a continuation-in-part of application Serial Number 177,466 filed May 5, 1962, now abandoned.

This invention relates to a process of controlling bacterial organism growth in soluble oil emulsions and to the soluble oil emulsions capable of exercising this control of unwanted bacterial growth.

Soluble oil emulsions have long been employed as coolants in various metal machining operations. These so-called soluble oil emulsions are conventionally aqueous emulsions of chemically modified oils. These oils are chemically modified to enable a stable and dilute water emulsion to be prepared. In these emulsions the water is, of course, in the continuous phase. These soluble oils are described in detail in "American Society of Tool Engineers—Tool Engineers Handbook," first edition, 1953, pages 357 et seq. and will not be discussed further.

The soluble oil base is diluted with 40 parts of water to make an appropriate emulsion. Soluble oil emulsions of this type are perennially troublesome as skin irritants and generate many persistent cases of dermatitis. It is the prime object of this invention to so modify soluble oil emulsions that they are incapable of supporting unwanted bacterial prolification.

This invention may be more readily understood by referring to the sole sheet of drawing which depicts a schematic section of one portion of a soluble oil emulsion coolant system.

In this drawing the main coolant tank or conduit has been designated 15. Iodine vapors are introduced into tank 15 through manifold 20 via pipe 16. The iodine vapors which are introduced through manifold 20 and pipe 16 are evaporated from iodine crystals contained in iodine cartridge 1. A stream of air originating in air inlet 6 is warmed in heat exchanger 9 by steam entering through pipe 11. The flow of steam through pipe 11 is controlled by mercury switch thermometer 7 and solenoid valve 8 to maintain the air stream at the desired temperature. Normally the temperature of this air stream will be held between 90 to 120° F.

The air stream which has been warmed by passage through heat exchanger 9 flows through regulator 10 and solenoid valve 13 into the base of iodine cartridge 1. This warmed air flows upwardly through iodine cartridge 1 and sublimes a minute amount of iodine. This iodine charged air leaves the cartridge 1 via pipe 16 and flows to manifold 20. A bypass 18 is provided to shunt the warm air stream periodically around iodine cartridge 1. This is accomplished by closing valve 13 and opening valve 17. This periodic change in the flow path of the warm air stream serves to volatilize any iodine which may have condensed in pipe 16 or manifold 20 and which would have a tendency to plug this apparatus. This flushing cycle would typically last 10 minutes out of each two hours. It is to be understood that all apparatus in contact with iodine vapors should be fabricated from iodine resistant materials such as polyethylene, polyvinyl chloride or glass.

The flowing medium which is warmed and serves to sublime the iodine need not be air but may be suitable gas or liquid. It is only necessary that a warmed stream of suitable fluid contact the iodine crystals and carry the sublimed crystals into the coolant. Water is a liquid suitable for this purpose. Nitrogen can well be substituted for air if available.

The introduction of minute amounts of iodine into the coolant in this manner permits the iodine to exterminate bacteria before it is consumed in the process of oxidizing the organic matter which is inherent in all coolant systems.

I claim:
1. The process of controlling bacterial organism growth in soluble oil emulsions comprising exposing iodine crystals to a current of a warmed fluid whereby iodine is volatilized and incorporated into the warmed fluid, and introducing the warmed iodine laden fluid into the soluble oil emulsion.

2. The process of controlling bacterial organism growth in soluble oil emulsions comprising exposing iodine crystals to a current of warmed gas whereby iodine is volatilized and incorporated into the warmed gas, and introducing the warmed iodine laden gas into the soluble oil.

3. The process of controlling bacterial organism growth in soluble oil emulsions comprising exposing iodine crystals to a current of warmed liquid whereby iodine is volatilized and incorporated into the warmed liquid, and introducing the warmed iodine laden liquid into the soluble oil.

4. The process of controlling bacterial organism growth in soluble oil emulsions comprising exposing iodine crystals to a current of warmed air whereby iodine is volatilized and incorporated into the warmed air, and introducing the warmed iodine laden air into the soluble oil.

5. The process of controlling bacterial organism growth in soluble oil emulsions comprising exposing iodine crystals to a current of warmed water whereby iodine is volatilized and incorporated into the warmed water, and introducing the warmed iodine laden water into the soluble oil.

References Cited by the Examiner
UNITED STATES PATENTS

| | | | |
|---|---|---|---|
| 1,426,633 | 8/1922 | Harding | 167—70 X |
| 2,743,208 | 4/1956 | Marcuse et al. | 167—70 X |
| 2,977,278 | 3/1961 | Shelanski et al. | 167—70 X |
| 3,033,785 | 5/1962 | Bennett | 252—49.5 X |

FOREIGN PATENTS 503,313  5/1939  Great Britain.

DANIEL E. WYMAN, *Primary Examiner.*
C. F. DEES, *Assistant Examiner.*